United States Patent
Okabe et al.

(10) Patent No.: US 11,426,963 B2
(45) Date of Patent: Aug. 30, 2022

(54) COMPOSITE BLADE AND METHOD OF FORMING COMPOSITE BLADE

(71) Applicant: MITSUBISHI HEAVY INDUSTRIES, LTD., Tokyo (JP)

(72) Inventors: Ryoji Okabe, Tokyo (JP); Masami Kamiya, Tokyo (JP); Kentaro Shindo, Tokyo (JP); Takahiro Tachibana, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 350 days.

(21) Appl. No.: 16/790,072

(22) Filed: Feb. 13, 2020

(65) Prior Publication Data

US 2020/0331222 A1   Oct. 22, 2020

(30) Foreign Application Priority Data

Apr. 17, 2019  (JP) .............................. JP2019-078864

(51) Int. Cl.
*B29D 99/00* (2010.01)
*B29C 70/34* (2006.01)
(Continued)

(52) U.S. Cl.
CPC ........ *B29D 99/0025* (2013.01); *B29C 70/345* (2013.01); *F01D 5/282* (2013.01); *B29L 2031/08* (2013.01); *F05D 2300/603* (2013.01)

(58) Field of Classification Search
CPC ... F01D 5/30; F01D 5/282; F01D 5/28; F01D 5/3007; F01D 5/3092; F05D 2230/00;
(Continued)

(56) References Cited

U.S. PATENT DOCUMENTS 3,910,719 A * 10/1975 Hessler ................. F01D 5/3092
                                                    416/213 R
4,169,694 A * 10/1979 Sanday ................. F01D 5/3007
                                                    416/241 B
(Continued)

FOREIGN PATENT DOCUMENTS

CN         105518256        4/2016
DE       102017210639      12/2018
(Continued)

OTHER PUBLICATIONS

Extended European Search Report dated Aug. 3, 2020 in corresponding European Patent Application No. 20156966.2.
(Continued)

*Primary Examiner* — Jason L Vaughan
(74) *Attorney, Agent, or Firm* — Wenderoth, Lind & Ponack, L.L.P.

(57) ABSTRACT

A composite blade made of prepreg obtained by impregnating reinforcement fibers with resin and curing the resin-impregnated reinforcement fibers, the composite blade including: a blade root provided on a base end and fitted into a blade groove; an airfoil provided extending from the blade root toward a tip end; and a metal patch provided between the blade groove and the blade root and placed on the blade root. The metal patch includes a plurality of projections protruding toward the blade root.

11 Claims, 7 Drawing Sheets

(51) Int. Cl.
*F01D 5/28* (2006.01)
*B29L 31/08* (2006.01)

(58) Field of Classification Search
CPC ............. F05D 2300/603; B29C 65/606; B29C 65/607; B29C 65/64
See application file for complete search history.

(56) References Cited

U.S. PATENT DOCUMENTS

| | | | | |
|---|---|---|---|---|
| 5,074,752 | A * | 12/1991 | Murphy | F01D 9/042 415/119 |
| 5,160,243 | A * | 11/1992 | Herzner | F01D 5/28 416/500 |
| 5,624,233 | A * | 4/1997 | King | F04D 29/322 416/213 R |
| 7,762,783 | B2 * | 7/2010 | Cairo | F01D 5/005 416/223 R |
| 8,282,356 | B2 * | 10/2012 | Cairo | F01D 5/3007 416/224 |
| 9,039,379 | B2 * | 5/2015 | Radomski | F01D 5/3007 416/220 R |
| 10,519,788 | B2 * | 12/2019 | Li | F01D 5/3084 |
| 10,774,660 | B2 * | 9/2020 | Luczak | F01D 5/323 |
| 2007/0048142 | A1 * | 3/2007 | Dambrine | F01D 5/3092 416/219 R |
| 2008/0003401 | A1 | 1/2008 | Barnes et al. | |
| 2009/0016890 | A1 * | 1/2009 | Douguet | F01D 5/3007 416/219 R |
| 2015/0050158 | A1 * | 2/2015 | Thomas | F01D 5/28 156/60 |
| 2016/0341052 | A1 | 11/2016 | Li et al. | |

FOREIGN PATENT DOCUMENTS

| | | |
|---|---|---|
| EP | 2 302 166 | 3/2011 |
| EP | 2 722 531 | 4/2014 |
| JP | 2016-527426 | 9/2016 |
| JP | 2020-41201 | 3/2020 |
| WO | 2014/193512 | 12/2014 |
| WO | 2015/023345 | 2/2015 |
| WO | 2017/082207 | 5/2017 |

OTHER PUBLICATIONS

Office Action dated Oct. 29, 2021 in corresponding Chinese Patent Application No. 202010097749.8, with English translation.

* cited by examiner

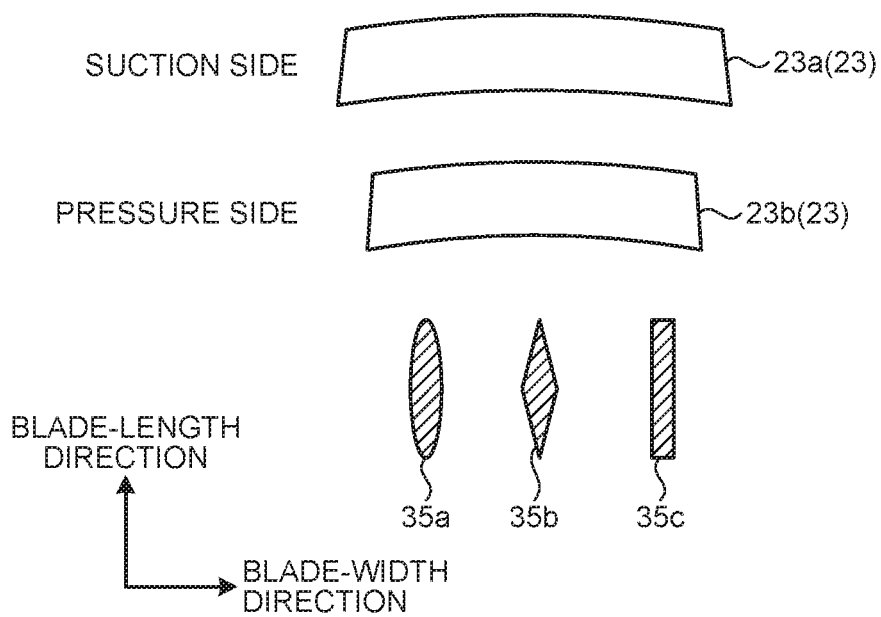
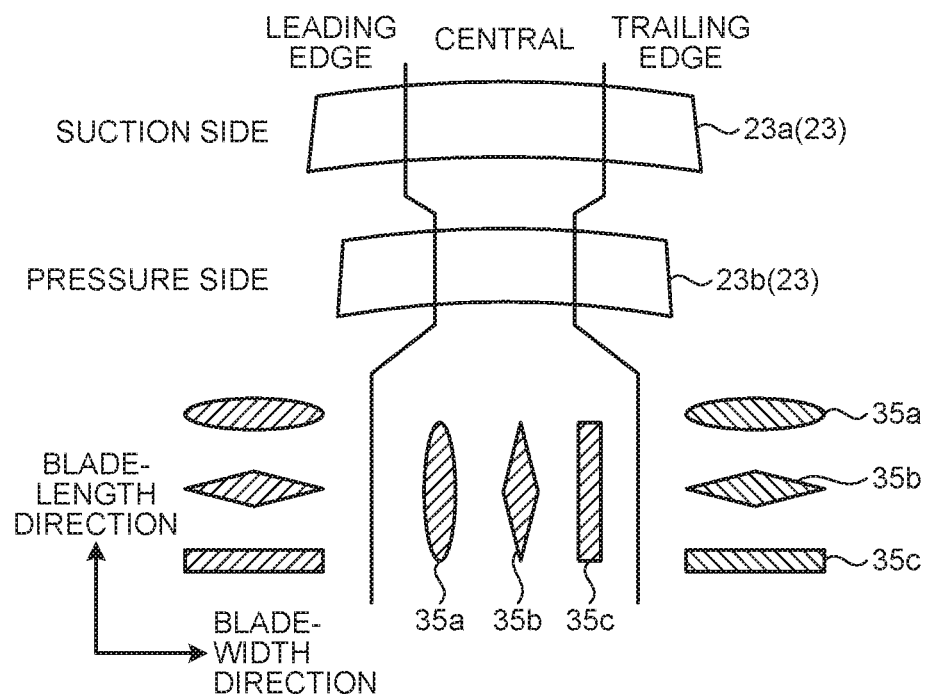

COMPOSITE BLADE AND METHOD OF FORMING COMPOSITE BLADE

CROSS-REFERENCE TO RELATED APPLICATIONS

The present application claims priority to and incorporates by reference the entire contents of Japanese Patent Application No. 2019-078864 filed in Japan on Apr. 17, 2019.

FIELD

The present invention relates to a composite blade and a method of forming a composite blade.

BACKGROUND

Conventionally, a composite blade provided with a metallic patch (see, for example, Patent Literature 1) disposed between a shank at the radially inner end of an airfoil and a dovetail connected to the shank is known. The metal patch is provided by being adhesively bonded to the dovetail so as to reduce stress concentration in the shank and the dovetail.

CITATION LIST

Patent Literature

Patent Literature 1: Japanese Patent Application Laid-open No. 2016-527426 A

SUMMARY

Technical Problem

In the composite blade in Patent Literature 1, however, the metal patch and the dovetail are adhesively bonded to each other, which makes it difficult to secure sufficient shear strength when shear stress acts on the bonding interface between the metal patch and dovetail.

Given this inconvenience, the present invention is directed to providing a composite blade and a method of forming composite blade that enable a blade root and a metal patch to be more strongly joined to each other and are capable of suitably reducing concentration of shear stress acting on the blade root.

Solution to Problem

A composite blade according to the present invention made of a compound material obtained by impregnating reinforcement fibers with resin and curing the resin-impregnated reinforcement fibers is disclosed. The composite blade includes a blade root fitted into a blade groove, an airfoil provided extending from the blade root toward a tip end, and a metal patch provided between the blade groove and the blade root and placed on the blade root. The metal patch includes a plurality of projections protruding toward the blade root.

This configuration enables the projections of the metal patch to be jammed into the blade root, whereby the blade root and the metal patch can be more strongly joined to each other. That is, the projections are configured to prevent the metal patch and the blade root from separating from each other in a sheared manner when shear stress acts on the interface between the metal patch and the blade root. The projections do not need to be provided on the entire surface of the metal patch and may be provided at least on the central part of the metal patch.

Further, it is preferable that the blade root is formed by laying up a plurality of layers of a reinforcement fiber base material in a direction facing the blade groove, the reinforcement fiber base material being obtained by impregnating reinforcement fibers with resin, and the projections have heights that allow the projections to extend across more than one of the laid-up layers of the reinforcement fiber base material in a protrusion direction in which the projections protrude toward the blade root.

This configuration enables the projections of the metal patch to be securely jammed into the blade root.

Further, it is preferable that average heights of the projections in a protrusion direction in which the projections protrude toward the blade root are lower in an end part of the metal patch than in a central part of the metal patch.

This configuration is based on the tendency that shear stress is more likely to concentrate in the end part of the metal patch, and thus has the average height of the projecting parts higher in the central part of the metal patch, thereby enabling shear stress to concentrate in the central part of the metal patch. Consequently, stress concentration is distributed uniformly all over the metal patch. Consequently, the end part of the metal patch can be prevented from separating under shear stress.

Further, it is preferable that in a protrusion direction in which the projections protrude toward the blade root, a height of each of the projections is different from a height of another one of the projections that is adjacent thereto.

Because each adjacent ones of the projections have different heights, this configuration can distribute shear stress in the direction of protrusion of the projections and thus can relax shear stress concentration.

Further, it is preferable that each of the projections includes a protruding portion and a folded-back portion, the protruding portion protruding in a protrusion direction, the folded-back portion being folded back from the protruding portion.

This configuration can increase the strength of the projections against being pulling out from the blade root, whereby the blade root and the metal patch can be more strongly joined to each other.

Further, it is preferable that within a placement surface of the blade root on which the metal patch is placed, a length direction means a direction from a base end toward a tip end and a width direction means a direction perpendicular to the length direction, and a length of each of the projections in the length direction is longer than a length thereof in the width direction.

Because the orientation ratio of fibers in the length direction from the base end to the tip end is relatively high in the reinforcement fibers in the blade root, this configuration can make it easier for the projections to be jammed into the blade root by making the length of the projection in the length direction longer.

Further, it is preferable that within a placement surface of the blade root on which the metal patch is placed, a length direction means a direction from a base end toward a tip end and a width direction means a direction perpendicular to the length direction, and a length of each of the projections in the width direction is longer than a length thereof in the length direction in opposite end parts of the metal patch in the width direction, and a length of each of the projections in the length direction is longer than a length thereof in the width direction in a central part of the metal patch in the width direction.

With this configuration, the blade root is more likely to thermally elongate toward opposite ends in the width direction when the composite blade is thermally molded. For this reason, the shapes of the projections are configured with the lengths of the projections in the width direction made longer in opposite end parts of the metal patch in the width direction, which makes it more likely for the blade root to slip against the projections in the width direction, thereby making it possible to absorb thermal elongation of the blade root.

Further, it is preferable that a part of the composite blade between the blade root and the airfoil is formed as a curved part that is curved, the metal patch placed on the blade root is a first metal patch, the composite blade further comprises a second metal patch placed on the curved part, and the second metal patch includes a plurality of projections formed on a surface thereof facing the curved part.

This configuration enables the projections of the second metal patch to be jammed into the curved part by placement of the second metal patches on the curved part. Thus, when the curved part is formed by having the layers of the reinforcement fiber base material laid up, interlayer strength in the curved part can be enhanced by the projections.

Further, it is preferable that the first metal patch and the second metal patch are continuously and integrally formed, and a boundary between the first metal patch and the second metal patch is formed through a process that reduces rigidity thereof as compared with other portions of the first metal patch and the second metal patch.

This configuration eliminates the need to separately form the first metal patch and the second metal patch and enables the first metal patch and the second metal patch to be integrally formed, which can facilitate manufacturing of the metal patches. The process that reduces the rigidity is not limited. Such a process may be grooving in which the portion at the boundary is made thinner than the portions other than the boundary or may be notching in which cuts are formed in parts of a portion at the boundary.

A method according to the present invention of forming a composite blade made of a compound material obtained by impregnating reinforcement fibers with resin and curing the resin-impregnated reinforcement fibers is disclosed. The composite blade includes a blade root fitted into a blade groove, an airfoil provided extending from the blade root toward a tip end, and a metal patch provided between the blade groove and the blade root and placed on the blade root, the metal patch having a plurality of projections protruding toward the blade root. The method includes placing the metal patch on a forming mold to mold the blade root, in such a manner that the projections protrude in a direction facing away from the forming mold, forming a laminate by laying up layers of a reinforcement fiber base material on the metal patch, the reinforcement fiber base material being obtained by impregnating reinforcement fibers with resin, and heating and curing the laminate.

This configuration enables the composite blade to be formed with the projections of the metal patch having been jammed into the blade root. Consequently, the composite blade that has the blade root and the metal patch more strongly joined to each other can be formed.

BRIEF DESCRIPTION OF DRAWINGS

FIG. 9 illustrates an example of projections provided on a metal patch for a composite blade according to a third embodiment.

FIG. 10 illustrates an example of projections provided on a metal patch for a composite blade according to a third embodiment.

DESCRIPTION OF EMBODIMENTS

The following describes embodiments according to the present invention in detail based on the drawings. These embodiments are not intended to limit this invention. Components in the following embodiments include those replaceable by the skilled person or those substantially identical to each other. Each of the components described below can be used in combination with any of the other components as appropriate and, provided that a plurality of embodiments are available, each of the embodiments can be used in combination with any of the other embodiments.

First Embodiment

Figure 1:
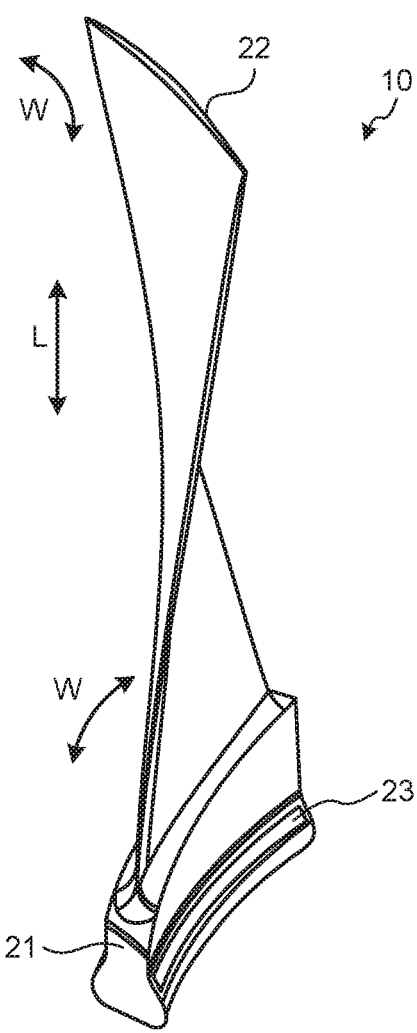
FIG. 1 is a perspective view illustrating the outer appearance of a composite blade according to a first embodiment.

FIG. 1 is a perspective view illustrating the outer appearance of a composite blade according to a first embodiment. A composite blade 10 according to a first embodiment is a blade formed of a composite material composed of reinforcement fibers and resin. The composite blade 10 is applicable to, for example, a turbine blade that is used in an apparatus such as a gas turbine or a gas turbine engine.

As illustrated in FIG. 1, the composite blade 10 extends from a blade root side formed as a fixed end to a blade tip side formed as a free end. Herein, directions connecting between the blade root side and the blade tip side are blade-length directions, which correspond to L directions illustrated in FIG. 1. In directions perpendicular to the blade-length directions in FIG. 1, one side of the composite blade 10 is a leading edge side, and the other side thereof is a trailing edge side. Herein, directions connecting between the leading edge side and the trailing edge side are blade-width directions, which correspond to W directions illustrated in FIG. 1.

The composite blade 10 is formed by laying up on one another and thermosetting a plurality of plies of prepreg obtained by impregnating reinforcement fibers with resin and provided as a reinforcement fiber base material. In the first embodiment, prepreg is used as the reinforcement fiber base material. However, any material containing reinforcement fibers and resin may be used as the reinforcement fiber base material. Examples of the reinforcement fibers include, but not limited to carbon fibers, glass fibers, and aramid fibers, and further include plastic fibers and metallic fibers. The resin is preferably thermosetting resin but may be thermoplastic resin. Examples of the thermosetting resin includes an epoxy resin, a polyester resin, and a vinyl ester resin. Examples of the thermoplastic resin include a polyamide resin, a polypropylene resin, an acrylonitrile butadiene styrene (ABS) resin, polyetheretherketone (PEEK), polyetherketoneketone (PEKK), and polyphenylenesulfide (PPS). However, the resin with which the reinforcement fibers are impregnated is not limited to these examples and may be another resin.

The composite blade 10 includes a blade root 21 provided in the blade root side, an airfoil 22 provided on one side of the blade root 21 that faces the blade tip, and metal patches 23 provided on the blade root 21.

As illustrated in FIG. 1, the blade root 21 and the airfoil 22 of the composite blade 10 are formed so as to be curved in a blade-width direction thereof. While one side of the composite blade 10 that is convex from the inner side toward the outer side thereof is a suction side, and the other side of the composite blade 10 that is concave from the inner side toward the outer side thereof is a pressure side.

Figure 2:
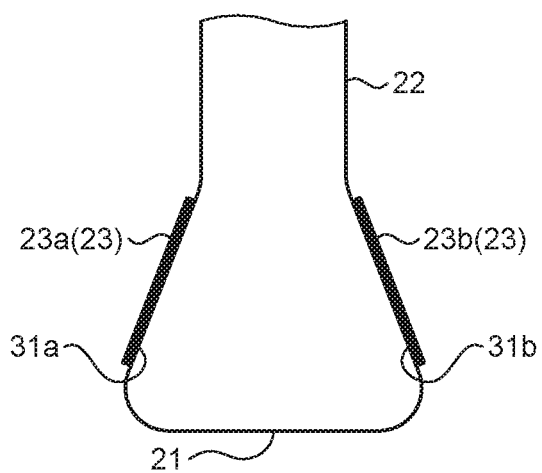
FIG. 2 is a sectional view schematically illustrating a blade root of the composite blade according to the first embodiment.

The blade root 21 is fitted into a blade groove formed in the outer circumference of a rotor that rotates about an axis. FIG. 2 is a sectional view schematically illustrating a blade root of the composite blade according to the first embodiment. Specifically, FIG. 2 is a section of the blade root 21 taken along a plane perpendicular to the blade-width direction. In this section, a direction perpendicular to blade-length direction is a blade-thickness direction. While one side in the blade-thickness direction is the suction side, the other side in the blade-thickness direction is the pressure side. In the section in FIG. 2, the blade root 21 has a tapering shape that tapers toward the blade tip, and has a surface on the suction side in the blade-thickness direction and a surface on the pressure side in the blade-thickness direction are contact surfaces (also referred to as dovetail surfaces) 31a and 31b that abut the blade groove. That is, the contact surface 31a on the suction side and the contact surface 31b on the pressure side are tapering surfaces that taper toward the blade tip.

The thickness of the airfoil 22 is formed so as to be thicker toward the blade root and thinner toward the blade tip in the blade-thickness direction. The thickness of the airfoil 22 is formed so as to be thicker in a central part and thinner toward the leading edge and toward the trailing edge in the blade-width direction.

Figure 3:
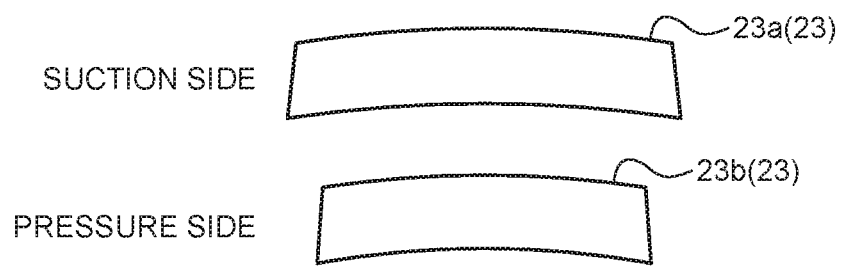
FIG. 3 is a schematic view illustrating metal patches for the composite blade according to the first embodiment.

The metal patches 23 are provided on the contact surfaces 31a and 31b of the blade root 21. That is, each of the metal patches 23 is provided between the blade groove of the rotor and the blade root 21 that is fitted into the blade groove. The metal patches 23 are integrally joined to the contact surfaces 31a and 31b of the blade root 21. As illustrated in FIG. 3, in the blade-width direction, the metal patch 23a provided on the contact surface 31a of the blade root 21 on the suction side thereof has a longer length than the metal patch 23b provided on the contact surface 31b of the blade root 21 on the pressure side thereof. This is because, while the contact surface 31b on the pressure side is a curved inner surface, the contact surface 31a on the suction side is a curved outer surface.

Figure 4:
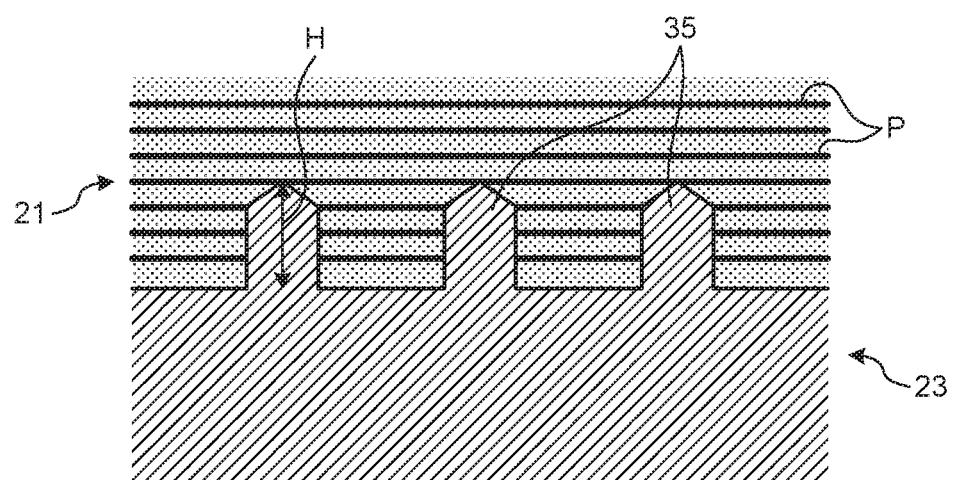
FIG. 4 is a sectional view schematically illustrating the metal patch.

As illustrated in FIG. 4, the metal patch 23 has a plurality of projections 35 formed on (protruding toward) the blade root 21. Here, the blade root 21 is formed with a plurality of layers of the prepreg P laid up in a direction facing the metal patch 23, and the projections 35 protrude in a direction in which the layers of prepreg P are laid up. The projections 35 may have heights H that are uniform in the direction of protrusion thereof. Each of the projections 35 is formed in a needle-like shape that is sharper toward the tip end thereof and the height H thereof in the direction of protrusion thereof allows the projection 35 to extend across more than one of the laid-up layers of prepreg P. Each of the projections 35 has the height H so as to extend across at least three of the laid-up layers of prepreg P. The shape of the tip of the projection 35 is preferably sharp, and pitches between the projections 35 are preferably larger than the fiber width of woven fabric applied. Furthermore, the projections 35 of the metal patch 23a on the suction side and the projections 35 of the metal patch 23b on the pressure side may be distributed in the same layout. The metal patches 23 each having the plurality of projections 35 may be formed by use of, for example, a three-dimensional forming apparatus.

Figure 5:
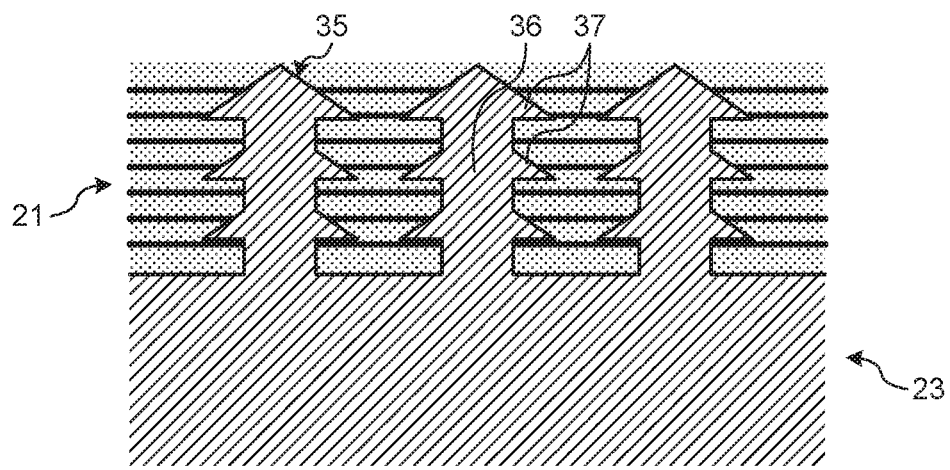
FIG. 5 is a sectional view schematically illustrating another example of the metal patch.

Each of the projections 35 of the metal patch 23 may have any shape that can be jammed into the blade root 21 and may have, for example, a shape illustrated in FIG. 5. Each of the projections 35 illustrated in FIG. 5 includes a protruding portion 36 and a folded-back portion 37. The protruding portion 36 protrudes in a direction in which the projection 35 protrudes. The folded-back portion 37 is folded back from the protruding portion 36. Each of the folded-back portions 37 is provided so as to protrude perpendicularly to a direction in which the protruding portion 36 protrudes. A multi-stage structure is preferably formed of at least two of the folded-back portions 37 with the at least two folded-back portions 37 being provided side by side at certain intervals in the direction in which the protruding portion 36 protrudes.

The composite blade 10 thus configured is fitted into the blade groove formed in the outer circumference of a rotor that rotates about an axis. Thus, the metal patches 32 for composite blade 10 are positioned between the blade groove and the blade root 21 and provided to abut the blade groove. A plurality of such composite blades 10 are provided, on the outer circumference of the rotor that rotates about the axis, next to one another in the circumferential direction at certain intervals. When the rotor rotates, fluid flows between the adjacent composite blades 10 in a direction from the leading edge toward the trailing edge of each of the composite blades 10. This rotation of the rotor imparts centrifugal force to the composite blade 10 in the blade-length direction thereof. When the centrifugal force is imparted to the composite blade 10 in the blade-length direction, frictional force is generated to the interfaces between the blade groove and the metal patches 23, and this frictional force is then transmitted and imparted, as shear stress, to the interfaces between the metal patches 23 and the blade root 21. In this condition, the projections 35 of the metal patches 23 are jammed into the at least two layers of prepreg P in the blade root 21 that are laid up in the direction in which the layers are laid up, thereby making the interface strength between the metal patches 23 and the blade root 21 higher than when none of the projections 35 are provided. The projections 35 also make interlayer strength between the layers of the prepreg P in the blade root 21 higher.

Figure 6:
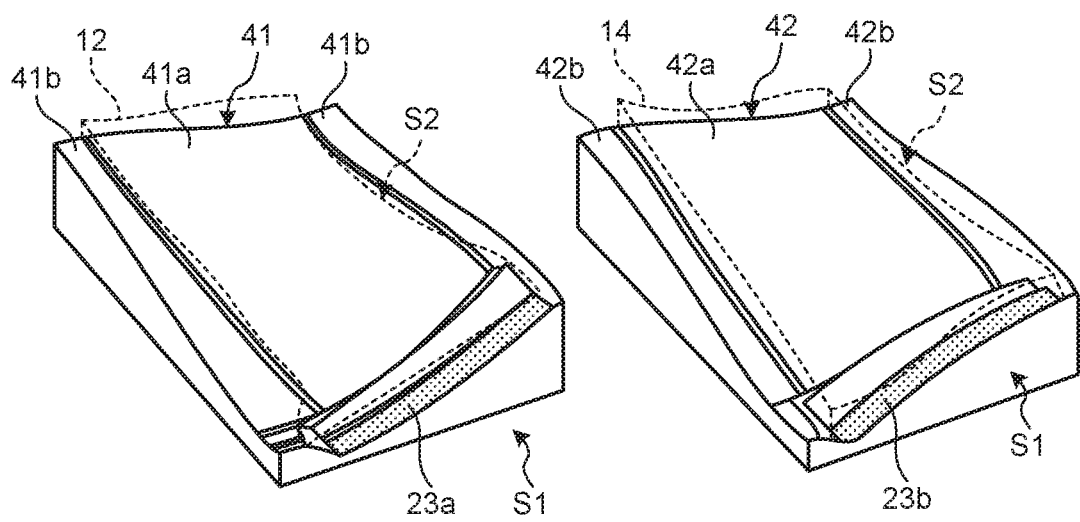
FIG. 6 illustrates a method of forming a composite blade according to the first embodiment.

Next, a method of forming the composite blade 10 is described with reference to FIG. 6. The composite blade 10 is formed by joining to each other a suction-side blade member 12, which is a portion in the suction side, and a pressure-side blade member 14, which is a portion in the pressure side.

The suction-side blade member 12 is obtained by laying up on one another and thermosetting a plurality of layers of prepreg P obtained by impregnating reinforcement fibers with resin. The suction-side blade member 12 is formed using a suction-side mold 41. The suction-side blade member 12 is formed in a curved shape such that, while one side thereof to face outward in the composite blade 10 is convex, the other side thereof to face inward in the composite blade 10 is concave. The suction-side mold 41 has a suction-side forming surface 41a for forming the external surface of the suction-side blade member 12, and a flat suction-side mold matching surface 41b provided around the periphery of the suction-side forming surface 41a. The suction-side forming surface 41a is formed so as to dent in a concave shape so that the outward-facing surface of the suction-side blade member 12 can be formed in a convex curved shape.

In the similar manner as the suction-side blade member 12, the pressure-side blade member 14 is obtained by laying up on one another and thermosetting a plurality of layers of prepreg P obtained by impregnating reinforcement fibers with resin. The pressure-side blade member 14 is formed using a pressure-side mold 42. The pressure-side blade member 14 is formed in a curved shape such that, while one side thereof to face outward in the composite blade 10 is concave, the other side thereof to face inward in the composite blade 10 is convex. The pressure-side mold 42 has a pressure-side forming surface 42a for forming the external surface of the pressure-side blade member 14 and a flat pressure-side mold matching surface 42b provided around the periphery of the pressure-side forming surface 42a. The pressure-side forming surface 42a is formed so as to swell in a convex shape so that the outward-facing surface of the pressure-side blade member 14 can be formed in a concave curved shape.

In the method of forming the composite blade, the metal patch 23a to be provided on the blade root 21 in the suction side thereof is placed on the suction-side forming surface 41a and a part thereof corresponding to the blade root 21 of the suction-side mold 41 so that the projections 35 thereof can protrude in a direction facing away from the suction-side mold 41 (step S1: a placement step). Likewise, the metal patch 23b to be provided on the blade root 21 in the pressure side thereof is placed on the pressure-side forming surface 42a and a part thereof corresponding to the blade root 21 of the pressure-side mold 42 so that the projections 35 thereof can protrude in a direction facing away from the pressure-side mold 42.

Thereafter, layers of the prepreg P are laid up on one another while the projections 35 of the metal patch 23a on the suction side are thrust through the layers of the prepreg P, whereby a laying-up step for forming the suction-side blade member 12 yet to be cured is performed (step S2). Likewise, layers of the prepreg P are laid up on one another while the projections 35 of the metal patch 23b on the pressure side are thrust through the layers of the prepreg P, whereby a laying up step (step S2) for forming the pressure-side blade member 14 yet to be cured is performed.

The suction-side mold matching surface 41b of the suction-side mold 41 and the pressure-side mold matching surface 42b of the pressure-side mold 42 are placed on top of each other, whereby the suction-side blade member 12 and the pressure-side blade member 14 that are yet to be cured are placed on top of each other. Thereafter, a curing step for curing the suction-side blade member 12 and the pressure-side blade member 14 by heating these members from the outside of the suction-side mold 41 and the pressure-side mold 42 is performed, whereby the composite blade 10 is formed.

Thus, according to the first embodiment, the projections 35 of the metal patch 32 can be jammed into the blade root 21, whereby the blade root 21 and the metal patch 32 can be more strongly joined to each other. Consequently, the projections 35 can prevent the metal patch 32 and the blade root 21 from separating from each other in a sheared manner when shear stress acts on the interface between the metal patch 32 and the blade root 21.

According to the first embodiment, the projections 35 can be protruded through a plurality of layers of the prepreg P that are laid up in the blade root 21, so that the projections 35 of the metal patch 32 can be securely jammed into the blade root 21.

According to the first embodiment, the composite blade 10 that has the blade root 21 and the metal patch 32 more strongly joined to each other can be formed.

Second Embodiment

Figure 7:
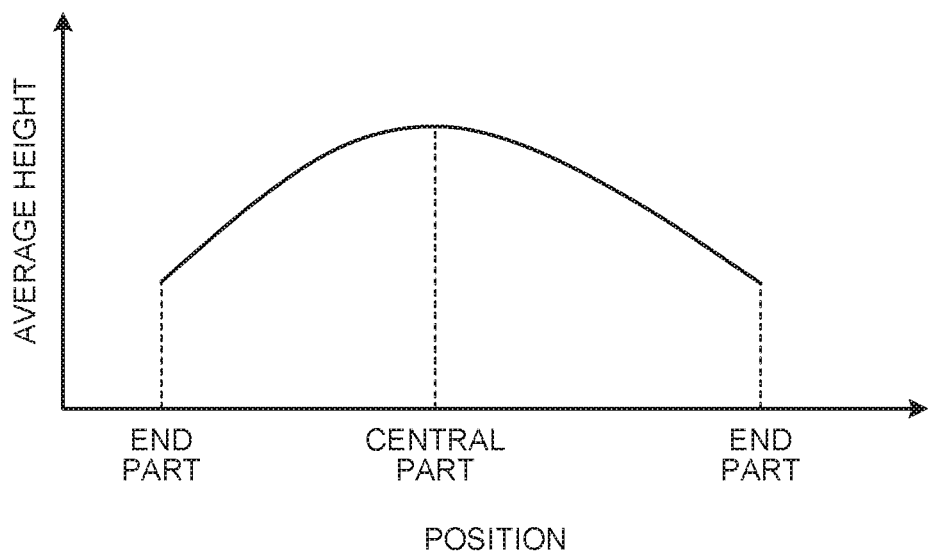
FIG. 7 is a graph illustrating the average heights of projections provided on a metal patch for a composite blade according to a second embodiment.
Figure 8:
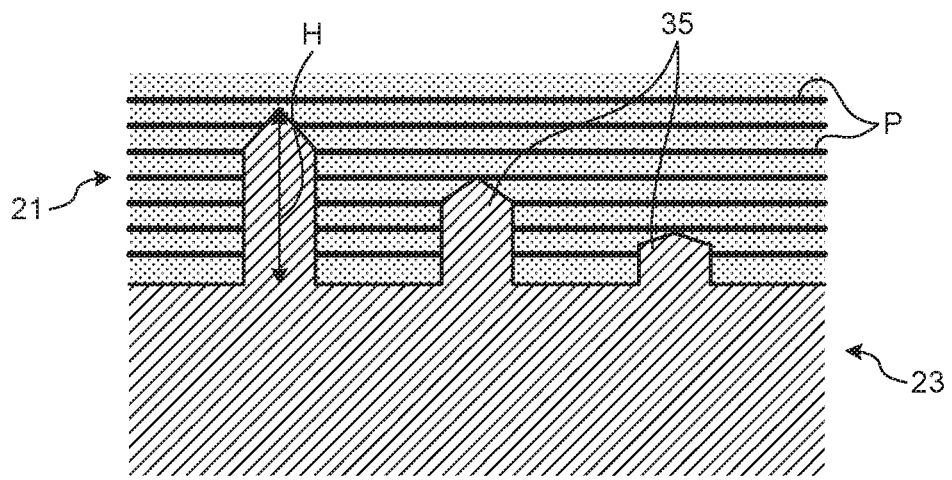
FIG. 8 is a sectional view schematically illustrating the metal patch for the composite blade according to the second embodiment.

Next, the composite blade 10 according to a second embodiment is described with reference to FIG. 7 and FIG. 8. In the second embodiment, for the sake of avoiding redundant description, parts different from the first embodiment are described, and the same components as those in the first embodiment are described with the same reference signs. FIG. 7 is a graph illustrating the average heights of projections provided on a metal patch for a composite blade according to a second embodiment. FIG. 8 is a sectional view schematically illustrating the metal patch for the composite blade according to the second embodiment.

In the composite blade 10 according to the first embodiment, the heights H of all the projections 35 in the direction in which the projections 35 protrude from the metal patch 23 are uniform. In the composite blade 10 according to the second embodiment, however, the heights H of the projections 35 in the direction in which the projections 35 protrude from the metal patch 23 are varied.

In FIG. 7, the horizontal axis represents the position in the metal patch 23 in the blade-length direction and the blade-width direction, and the vertical axis represents the average height of the projections 35 of the metal patch 23. Herein, the average height means a height obtained by averaging the heights of the projections 35 at a certain position.

As illustrated in FIG. 7, the average heights of the projections 35 of the metal patch 23 are smaller toward the opposite ends in the blade-length direction and the blade-width direction and are larger toward the central part in the blade-length direction and the blade-width direction. That is, the average heights of the projections 35 of the metal patch 23 are smaller in a region toward the blade tip in the blade-length direction and in a region toward the base end in the blade-length direction than in a region at the central part in the blade-length direction. In other words, the projections 35 of the metal patch 23 have a larger average height in a region at the central part thereof in the blade-length direction than in regions closer to the blade tip in the blade-length direction and in regions closer to the base end in the blade-length direction. Additionally, the average heights of the projections 35 of the metal patch 23 are smaller in a region toward the leading edge in the blade-width direction and in a region toward the trailing edge in the blade-width direction than in a region at the central part in the blade-width direction. In other words, the projections 35 of the metal patch 23 have a larger average height in a region at the central part thereof in the blade-width direction than in regions closer to the leading edge in the blade-width direction and in regions closer to the trailing edge in the blade-width direction.

While FIG. 7 illustrates the average heights of the projections 35 continuously change, this is not a limiting example. The average heights of the projections 35 may change in a stepwise manner.

As illustrated in FIG. 8, each of the projections 35 of the metal patch 23 and another one of the projections 35 that is adjacent thereto have different heights. The projections 35 of the metal patch 23 have, for example, heights gradually decreasing toward one side from the other side in the direction in which the projections 35 are adjacent to one another. That is, the projections 35 are configured in such a manner that the projections 35 occupy a less proportion of the area of a section that is deeper in the direction in which the layers of the prepreg P are laid up relative to the contact surfaces 31a and 31b of the blade root 21. The projections 35 illustrated in FIG. 8 are an example, and the heights of the projections 35 need only to be determined in such a manner that each adjacent ones of the projections 35 have different heights. Accordingly, the projections 35 may have random heights.

According to the second embodiment, the metal patch 23 has the average heights of the projections 35 higher toward the central part thereof based on the tendency that shear stress is more likely to concentrate in end parts of the metal patch 23 in the blade-length direction and the blade-width direction, so that shear stress can be concentrated in the central part of the metal patch 23. Consequently, stress concentration is distributed uniformly all over the metal patch 23. Consequently, the end parts of the metal patch 23 can be prevented from separating by the action of shear stress.

According to the second embodiment, each adjacent ones of the projections 35 have different heights, whereby shear stress can be distributed in the direction of protrusion thereof. Thus, shear stress concentration can be relaxed.

While the above description of the second embodiment adopts the projections 35 of the metal patch 23 that are configured as illustrated in FIG. 7 and FIG. 8, the projections 35 may be configured as illustrated at least in one of the configurations in FIG. 7 and FIG. 8.

Third Embodiment

Figure 11:
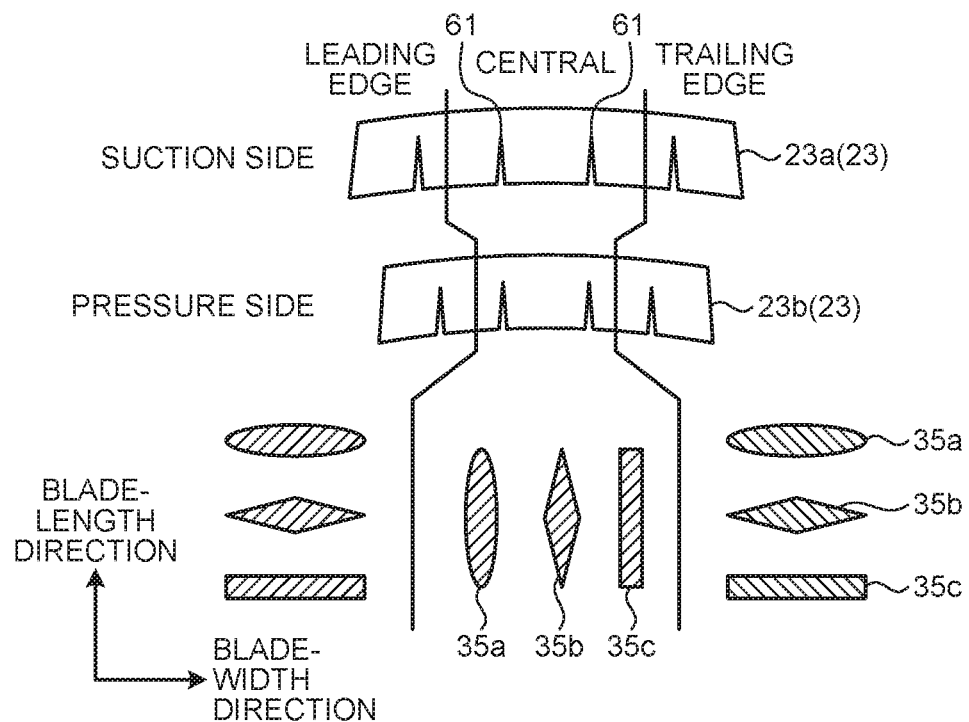
FIG. 11 illustrates an example of projections provided on a metal patch for a composite blade according to a third embodiment.

Next, the composite blade 10 according to a third embodiment is described with reference to FIGS. 9 to 11. In the third embodiment also, for the sake of avoiding redundant description, parts different from the first and the second embodiments are described, and the same components as those in the first and the second embodiments are described with the same reference signs. FIGS. 9 to 11 illustrate an example of projections provided to a metal patch for a composite blade according to the third embodiment.

In the composite blade 10 according to the first embodiment, no limitation is imposed on the shapes of the projections 35 of the metal patch 23 that face contact surface 31 in the blade-length direction and the blade-width direction. In the composite blade 10 according to the third embodiment, the shapes of the projections 35 of the metal patch 23 that face the contact surface 31 in the blade-length direction and the blade-width direction have predefined shapes.

As illustrated in FIG. 9, each of the projections 35 of the metal patch 23 according to the third embodiment has a longer length in the blade-length direction than in the blade-width direction within the contact surface (placement surface) 31, that is, within a plane perpendicular to the direction of protrusion thereof. In FIG. 9, each of the projections 35 on the entire region of the metal patch 23 has a longer length in the blade-length direction than in the blade-width direction. Examples of the projection 35 that has a longer length in the blade-length direction than in the blade-width direction include a projection 35a having an elliptical shape, a projection 35b having a diamond shape, and a projection 35c having a rectangular shape, on a plane perpendicular to the direction of the projection.

Furthermore, the projections 35 may be configured as illustrated in FIG. 10. As illustrated in FIG. 10, the metal patch 23 according to the third embodiment are segmented into a central region in the blade-width direction, a leading-edge side region in the blade-width direction, and a trailing-edge side region in the blade-width direction. Given this segmentation, each of the projections 35 in the central region has a longer length in the blade-length direction than in the blade-width direction within the contact surface (placement surface) 31, that is, within a plane perpendicular to the direction of the projection. In contrast, each of the projections 35 in the leading-edge side region and in the trailing-edge side region has a longer length in the blade-width direction than in the blade-length direction within the contact surface 31. In FIG. 10, as in FIG. 9, examples of the projection 35 include a projection 35a having an elliptical shape, a projection 35b having a diamond shape, and a projection 35c having a rectangular shape, on a plane perpendicular to the direction of the projection.

In addition, the metal patches 23 may be configured as illustrated in FIG. 11. As illustrated in FIG. 11, the metal patches 23 are obtained by forming cuts 61 in the metal patch 23 illustrated in FIG. 10. The cuts 61 are removed parts formed in each of the metal patches 23 at certain intervals in the blade-width direction. Each of the cuts 61 is formed so as to extend in the blade-length direction. The metal patch 23 is formed in such a manner that a part of a portion thereof that has the cut 61 formed is continuous in the blade-length direction. The cuts 61 are formed in the metal patches 23 in FIG. 10 but may be formed in the metal patches 23 in FIG. 9 or may be formed in the metal patches 23 according to the first embodiment or the second embodiment.

According to the third embodiment, when the orientation ratio of fibers the direction of which matches the blade-length direction is relatively high in the reinforcement fibers in the blade root 21, the shapes of the projections 35 each having a shape that is longer in the blade-length direction can make it less likely for the reinforcement fibers to interfere with laying up of the layers of the prepreg P and make it easier for the projections 35 to be jammed into the blade root 21, as described above.

According to the third embodiment, the blade root 21 is more likely to thermally elongate toward the opposite ends (toward the leading edge and the trailing edge) in the blade-width direction when the composite blade 10 is thermoset. For this reason, the lengths of the projections 35 in the blade-width direction are made longer in opposite end parts of the metal patches 32 in the blade-width direction, which makes it more likely for the blade root 21 to slip against the projections 35 in the width direction, thereby making it possible to absorb thermal elongation of the blade root 21 during the thermosetting.

According to the third embodiment, formation of the cuts 61 in the metal patch 23 enables the metal patches 23 to be allowed to stretch in the blade-width direction. Consequently, the metal patches 23 can absorb thermal elongation of the blade root 21 during the thermosetting.

Fourth Embodiment

Figure 12:
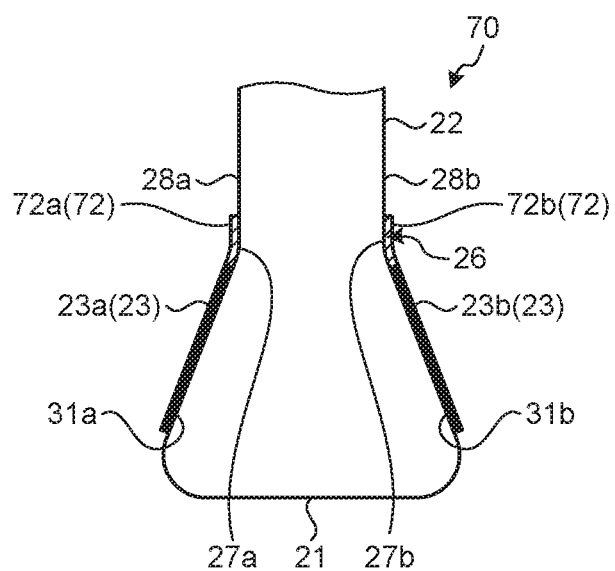
FIG. 12 is a sectional view schematically illustrating a blade root of a composite blade according to a fourth embodiment.
Figure 13:
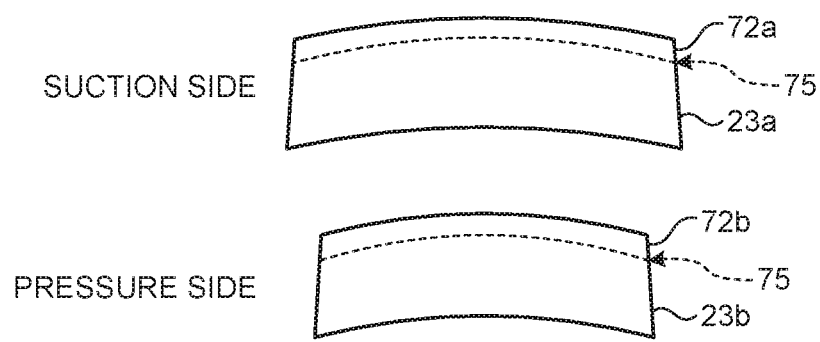
FIG. 13 is a schematic view illustrating metal patches for the composite blade according to the fourth embodiment.

Next, a composite blade 70 according to a fourth embodiment is described with reference to FIG. 12 and FIG. 13. In the fourth embodiment also, for the sake of avoiding redundant description, parts different from the first to the third embodiments are described, and the same components as those in the first to the third embodiments are described with the same reference signs. FIG. 12 is a sectional view schematically illustrating a blade root of the composite blade according to the fourth embodiment. FIG. 13 is a schematic view illustrating metal patches for the composite blade according to the fourth embodiment.

The composite blade 70 according to the fourth embodiment includes the metal patches 23 according to the first embodiment and further includes additional metal patches 72. A part of the composite blade 70 between the blade root 21 and the airfoil 22 according to the fourth embodiment is formed as a curved part 26 that is curved. The curved parts 26 include suction-side curved surface 27a, which is a surface on the suction side in the blade-thickness direction, and a pressure-side curved surface 27b, which is a surface on the pressure side in the blade-thickness direction. The suction-side curved surface 27a continues into the contact surface 31a on the suction side and also continues into a suction-side shank surface 28a, which is a surface on the suction side of the airfoil 22. The pressure-side curved surface 27b continues into the contact surface 31b on the pressure side and also continues into a pressure-side shank surface 28b, which is a surface on the pressure side of the airfoil 22.

While the metal patches 23 placed on the blade root 21 are denoted as first metal patches 23, the metal patches 72 placed on the curved part 26 are denoted as second metal patches 72. The first metal patches 23 are configured in the same manner as those in the first embodiment, and the description thereof is omitted.

The second metal patches 72 are provided on the suction-side curved surface 27a and the pressure-side curved surface 27b of the curved part 26. The second metal patches 72 are integrally joined to the suction-side curved surface 27a and the pressure-side curved surface 27b of the curved part 26. The second metal patch 72a provided on the suction-side curved surface 27a has a longer length in the blade-width direction than the second metal patch 72b provided on the pressure-side curved surface 27b.

In the same manner as the first metal patches 23, each of the second metal patches 72 has a plurality of projections formed on a surface thereof facing the curved part 26. The projections of the second metal patch 72 are configured in the same manner as the projections 35 of the first metal patch 23, and the description thereof is omitted.

As illustrated in FIG. 13, each of the first metal patches 23a and 23b and a corresponding one of the second metal patches 72a and 72b are placed adjacent to each other in the blade-length direction and continuously and integrally formed. The boundary between each of the first metal patches 23a and 23b and a corresponding one of the second metal patches 72a and 72b is formed through a process that reduces the rigidity thereof as compared with the other portions of the first metal patches 23a and 23b and the second metal patches 72a and 72b. Examples of the process that reduces the rigidity include notching in which cuts 75 are formed in parts of a portion at the boundary. Grooving in which the portion at the boundary is made thinner than the portions other than the boundary may be alternatively performed.

As described above, according to the fourth embodiment, placement of the second metal patches 72 on the curved part 26 enables the projections 35 of the second metal patch 72 to be jammed into the curved part 26. Interlayer strength in the curved part 26 formed by having the layers of the prepreg P laid up can be enhanced by the projections 35.

According to the fourth embodiment, the first metal patch 23 and the corresponding second metal patch 72 do not need to be separately formed and can be integrally formed, which can facilitate manufacturing of the metal patches 23 and 72.

REFERENCE SIGNS LIST

10 COMPOSITE BLADE
12 SUCTION-SIDE BLADE MEMBER
14 PRESSURE-SIDE BLADE MEMBER
21 BLADE ROOT
22 AIRFOIL
23 METAL PATCH
26 CURVED PART
31a, 31b CONTACT SURFACE
35 PROJECTION
41 SUCTION-SIDE MOLD
42 PRESSURE-SIDE MOLD
61 CUT
70 COMPOSITE BLADE (FOURTH EMBODIMENT)
72 SECOND METAL PATCH
75 CUT
P PREPREG

The invention claimed is:

1. A composite blade made of a compound material obtained by impregnating reinforcement fibers with resin and curing the resin-impregnated reinforcement fibers, the composite blade comprising:
    a blade root fitted into a blade groove;
    an airfoil provided extending from the blade root toward a tip end; and
    a metal patch provided between the blade groove and the blade root and placed on the blade root, wherein
    the metal patch includes a plurality of projections protruding toward the blade root.

2. The composite blade according to claim 1, wherein
    the blade root is formed by laying up a plurality of layers of a reinforcement fiber base material in a direction facing the blade groove, the reinforcement fiber base material being obtained by impregnating reinforcement fibers with resin, and
    the projections have heights that allow the projections to extend across more than one of the laid-up layers of the reinforcement fiber base material in a protrusion direction in which the projections protrude toward the blade root.

3. The composite blade according to claim 1, wherein average heights of the projections in a protrusion direction in which the projections protrude toward the blade root are lower in an end part of the metal patch than in a central part of the metal patch.

4. The composite blade according to claim 1, wherein, in a protrusion direction in which the projections protrude toward the blade root, a height of each of the projections is different from a height of another one of the projections that is adjacent thereto.

5. The composite blade according to claim 1, wherein each of the projections includes a protruding portion and a folded-back portion, the protruding portion protruding in a protrusion direction, the folded-back portion being folded back from the protruding portion.

6. The composite blade according to claim 1, wherein,
within a placement surface of the blade root on which the metal patch is placed, a length direction means a direction from a base end toward a tip end and a width direction means a direction perpendicular to the length direction, and
a length of each of the projections in the length direction is longer than a length thereof in the width direction.

7. The composite blade according to claim 1, wherein
within a placement surface of the blade root on which the metal patch is placed, a length direction means a direction from a base end toward a tip end and a width direction means a direction perpendicular to the length direction, and
a length of each of the projections in the width direction is longer than a length thereof in the length direction in opposite end parts of the metal patch in the width direction, and a length of each of the projections in the length direction is longer than a length thereof in the width direction in a central part of the metal patch in the width direction.

8. The composite blade according to claim 1, wherein
within a placement surface of the blade root on which the metal patch is placed, a length direction means a direction from a base end toward a tip end and a width direction means a direction perpendicular to the length direction, and
the metal patch has notches formed at certain intervals in the width direction.

9. The composite blade according to claim 1, wherein
a part of the composite blade between the blade root and the airfoil is formed as a curved part that is curved,
the metal patch placed on the blade root is a first metal patch,
the composite blade further comprises a second metal patch placed on the curved part, and
the second metal patch includes a plurality of projections formed on a surface thereof facing the curved part.

10. The composite blade according to claim 9, wherein
the first metal patch and the second metal patch are continuously and integrally formed, and
a boundary between the first metal patch and the second metal patch is formed through a process that reduces rigidity thereof as compared with other portions of the first metal patch and the second metal patch.

11. A method of forming the composite blade according to claim 1, the method comprising:
placing the metal patch on a forming mold to mold the blade root, in such a manner that the projections protrude in a direction facing away from the forming mold;
forming a laminate by laying up layers of a reinforcement fiber base material on the metal patch, the reinforcement fiber base material being obtained by impregnating reinforcement fibers with resin; and
heating and curing the laminate.

* * * * *